US010511697B2

(12) United States Patent
Mishra et al.

(10) Patent No.: US 10,511,697 B2
(45) Date of Patent: *Dec. 17, 2019

(54) X2 PROTOCOL PROGRAMMABILITY

(71) Applicant: Parallel Wireless, Inc., Nashua, NH (US)

(72) Inventors: Rajesh Kumar Mishra, Westford, MA (US); Steven Paul Papa, Windham, NH (US); Kaitki Agarwal, Westford, MA (US); Zeev Lubenski, North Andover, MA (US); Jitender Arora, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/900,439

(22) Filed: Feb. 20, 2018

(65) Prior Publication Data

US 2018/0183903 A1 Jun. 28, 2018

Related U.S. Application Data

(63) Continuation of application No. 15/299,459, filed on Oct. 20, 2016, now Pat. No. 9,900,407.

(Continued)

(51) Int. Cl.
*H04W 92/02* (2009.01)
*H04L 29/06* (2006.01)

(Continued)

(52) U.S. Cl.
CPC ............. *H04L 69/08* (2013.01); *H04W 92/02* (2013.01); *H04W 84/042* (2013.01); *H04W 88/16* (2013.01); *H04W 92/045* (2013.01)

(58) Field of Classification Search
CPC ..... H04W 92/02; H04W 36/14; H04W 80/00; H04W 84/042; H04W 88/16;

(Continued)

(56) References Cited

U.S. PATENT DOCUMENTS

| | | | |
|---|---|---|---|
| 9,510,256 | B2 | 11/2016 | Krishna et al. |
| 2004/0215794 | A1 | 10/2004 | Lauer |

(Continued)

FOREIGN PATENT DOCUMENTS

| | | | |
|---|---|---|---|
| EP | 2633158 | A1 | 5/2012 |
| EP | 2816846 | A1 | 12/2014 |
| WO | 2014069954 | A1 | 5/2014 |

OTHER PUBLICATIONS

Third Generation Partnership Project, 3GPP TS 36.423 V 11.9.0, "3rd Generation Partnership Project; Technical Specification Group Radio Access Network; Evolved Universal Terrestrial Radio Access Network (E-UTRAN); X2 Application Protocol (X2AP) Release 11", Mar. 2015.

*Primary Examiner* — Fred A Casca
(74) *Attorney, Agent, or Firm* — Michael Saji; David W. Rouille

(57) ABSTRACT

A method for X2 interface communication is disclosed, comprising: at an X2 gateway for communicating with, and coupled to, a first and a second radio access network (RAN), receiving messages from the first RAN according to a first X2 protocol and mapping the received messages to a second X2 protocol for transmission to the second RAN; maintaining state of one of the first RAN or the second RAN at the X2 gateway; executing executable code received at an interpreter at the X2 gateway as part of the received messages; altering the maintained state based on the executed executable code; and receiving and decoding an initial X2 message from the first RAN; identifying specific strings in the initial X2 message; matching the identified specific (Continued)

strings in a database of stored scripts; and performing a transformation on the initial X2 message, the transformation being retrieved from the database for stored scripts, the stored scripts being transformations.

19 Claims, 5 Drawing Sheets

Related U.S. Application Data

(60) Provisional application No. 62/244,127, filed on Oct. 20, 2015.

(51) Int. Cl.
*H04W 84/04* (2009.01)
*H04W 88/16* (2009.01)
*H04W 92/04* (2009.01)

(58) Field of Classification Search
CPC ........ H04W 48/18; H04W 8/02; H04L 69/18; H04L 12/4633; H04L 69/08
USPC .................. 455/435.2, 426.1, 443, 445, 465; 370/338, 401, 352
See application file for complete search history.

(56) References Cited

U.S. PATENT DOCUMENTS

2005/0129198 A1* 6/2005 Sudhir .................... H04L 12/64 379/90.01
2010/0142382 A1 6/2010 Jungck et al.
2010/0227603 A1 9/2010 Gupta et al.
2011/0151907 A1 6/2011 Oh et al.
2013/0177112 A1* 7/2013 Lan ....................... H04L 5/0046 375/345
2014/0052783 A1* 2/2014 Swatsky ............... H04W 80/04 709/204
2014/0256251 A1* 9/2014 Caceres ............... H04B 5/0031 455/41.1
2014/0308959 A1 10/2014 De Benedittis et al.
2015/0109999 A1* 4/2015 Godin ................... H04W 92/20 370/328
2015/0378989 A1* 12/2015 Wu ....................... G06F 17/289 704/3
2016/0037432 A1 2/2016 Lin et al.
2016/0227449 A1 8/2016 Sivavakeesar et al.
2017/0070923 A1 3/2017 Li et al.
2017/0156086 A1 6/2017 Tomici et al.
2017/0251412 A1 8/2017 Xu et al.

* cited by examiner

X2 PROTOCOL PROGRAMMABILITY

CROSS-REFERENCE TO RELATED APPLICATIONS

This application is a continuation of, and claims the benefit under 35 U.S.C. § 120 of, U.S. patent application Ser. No. 15/299,459, filed Oct. 20, 2016 and entitled "X2 Protocol Programmability," which itself claims the benefit of priority under 35 U.S.C. § 119(e) based on U.S. Provisional Pat. App. No. 62/244,127, entitled "X2 Protocol Programmability," each of which are hereby incorporated by reference herein in their entirety for all purposes.

In addition, the following references are incorporated by reference in their entirety for all purposes: [1] 3GPP TS 36.423 X2 application protocol (X2AP); [2] Small Cell Forum X2 Interoperability for Hetnet co-ordination—document 059.05.01; [3] [SCF085] 'The value of Small Cell Forum Plugfests' http://scfio/document/085; [4] 36.902, 'Self-configuring and self-optimizing network (SON) use cases and solutions'; [5] 3GPP 36.314 'Evolved Universal Terrestrial Radio Access' (EUTRA); Layer 2—Measurements'; [6] http://www.lua.org/home.html; http://www.lua.org/manual/5.3/; http://www.lua.org/pil/contents.html; [7] U.S. Pat. App. Pub. No. US-2015-0257051-A1, "Federated X2 Gateway"; [8] U.S. Pat. No. 6,594,685, "Universal Application Programming Interface Having Generic Message Format."

BACKGROUND

In today's radio access network, a variety of vendors provide the radio access hardware. Unfortunately, the hardware tends to be completely interoperable only with products from the same manufacturer.

The use of common standards, including 3GPP standards, has been helpful in allowing interoperability. However, the standards are not always completely clear or completely specified. Also, since standards change slowly, manufacturers often add new features that are not supported by competitors' products.

Even common standards, such as X2, which permit exchange of arbitrary information between nodes, are not as useful as they could be because vendors are unwilling to expose functionality beyond what is minimally required.

SUMMARY

Systems and methods may be disclosed for providing programmable protocol proxying and brokering for X2 interface communications.

In one embodiment, a gateway for X2 interface communication is disclosed, comprising: an X2 internal interface for communicating with, and coupled to, a first and a second radio access network (RAN); an X2 language processing module for receiving messages from the first RAN according to a first X2 protocol and mapping the received messages to a second X2 protocol for transmission to the second RAN; and an X2 external interface for communicating with, and coupled to, a gateway in a wireless telecommunications core network.

The gateway may further comprise a database for storing a plurality of rules for performing mapping at the X2 language processing module. The gateway may further comprise a state machine for maintaining state of one of the first RAN or the second RAN, and an interpreter for executing executable code received as part of the received messages and altering the state machine based on the executed executable code. The X2 language processing module may further comprise a regular expression pattern matcher for identifying patterns in the received messages that are present in the first X2 protocol but not present in the second X2 protocol.

In a further embodiment, a method for X2 interface communication is disclosed, comprising: at an X2 gateway for communicating with, and coupled to, a first and a second radio access network (RAN), receiving messages from the first RAN according to a first X2 protocol and mapping the received messages to a second X2 protocol for transmission to the second RAN; maintaining state of one of the first RAN or the second RAN at the X2 gateway; executing executable code received at an interpreter at the X2 gateway as part of the received messages; altering the maintained state based on the executed executable code; and receiving and decoding an initial X2 message from the first RAN; identifying specific strings in the initial X2 message; matching the identified specific strings in a database of stored scripts; and performing a transformation on the initial X2 message, the transformation being retrieved from the database for stored scripts, the stored scripts being transformations.

The method may further comprise interworking, at the X2 gateway, the first X2 message from the first X2 protocol to the second X2 protocol and associating the first X2 protocol with the first RAN and the second X2 protocol with the second RAN, based on a list of supported X2 protocol versions for the first RAN and the second RAN. The method may further comprise storing a plurality of rules in a database for performing mapping. The method may further comprise: maintaining state of one of the first RAN or the second RAN; executing executable code received as part of the received messages; and altering the state machine based on the executed executable code. The method may further comprise, at a regular expression pattern matcher at the X2 gateway, identifying patterns in the received messages that may be present in the first X2 protocol but not present in the second X2 protocol. The method may further comprise sending a second X2 message to update an eNodeB state machine at the first RAN. The method may further comprise updating an eNodeB state machine at the gateway. The method may further comprise sending a filtered second X2 message to the second RAN.

The method may further comprise providing code execution hooks for enabling the received messages according to the first X2 protocol to cause code execution at the gateway server. The method may further comprise providing code execution hooks for enabling code execution at the gateway server of executable code received via the received messages. The method may further comprise enabling new X2 protocol features via an executable code payload sent in an information element from the gateway server. The method may further comprise blocking transmission of executable code payloads at the gateway server to an incompatible RAN. The method may further comprise mapping a first unitless threshold value compatible with the first RAN to a second unitless threshold value compatible with the second RAN. The method may further comprise adding, deleting, or modifying information elements in the messages from the first RAN but not compatible with the second RAN to information elements compatible with the second RAN.

The method may further comprise storing a plurality of rules in a database for performing mapping, the plurality of rules The method may further comprise regular expression transformations of the received messages. The method may further comprise storing a plurality of rules in a database for performing mapping, the plurality of rules The method may further comprise rules for interpretation by a scripting language message processor at the gateway server. The method may further comprise storing a plurality of rules in a database for performing mapping, the plurality of rules The method may further comprise rules for interpretation by a scripting language message processor at the first RAN or the second RAN. The method may further comprise processing messages in Lua, Python, Ruby, Perl, or Javascript. The method may further comprise handling X2 mobility management, load management, general error, X2 reset, X2 setup, X2 release, X2 removal, configuration update, mobility parameter management, mobility robustness optimization, or energy consumption management messages. The method may further comprise handling adjustment of inter-radio access technology (inter-RAT) or intra-radio access technology (intra-RAT) mobility thresholds. wherein at least one of the supported X2 protocol versions may be a list of supported individual information elements (IEs) and protocol commands, or an X2 protocol version number.

DETAILED DESCRIPTION

Figure 1:
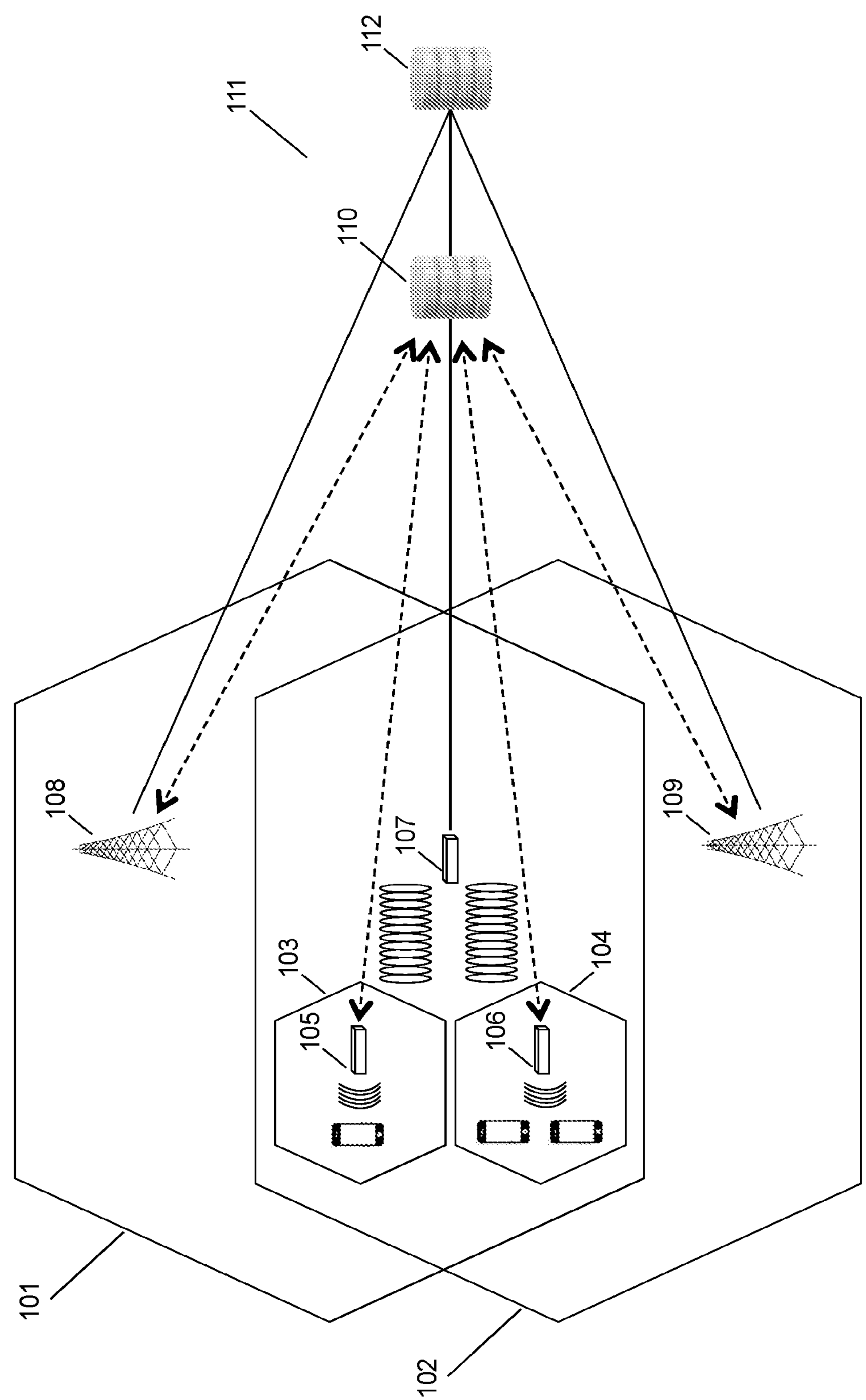
FIG. 1 is a schematic diagram of a Long Term Evolution (LTE) architecture, in accordance with some embodiments.

We have developed a solution that will allow extensibility and interworking among multiple vendors and versions of technology. Beyond merely interworking, the described solution allows deployment of new protocol versions/parameters up to and including deployment of executable code in messages sent to or from a base station. As well, a state machine at the base station or in the network may be modified or affected by a message during processing.

A controller in the network that is in communication with the radio access network and packet core network provides an interworking module for parameter and logic programmability. The controller is arranged in a hub-and-spoke architecture, such that the controller receives messages and forwards them to other base stations as needed, instead of, e.g., base stations sending X2 messages to each other and/or with a controller acting as an aggregator.

These goals are accomplished by adding code execution hooks to the current message processing architecture. In some embodiments, the code execution hooks may call a scripting language, which may perform interworking using a lightweight script. In some embodiments, the code execution hooks may permit the passing-in of executable code, to be saved and/or immediately executed by the host. These hooks may be added to either a base station, a gateway node, or both.

For example, an X2 message with a load information threshold may be sent from one vendor's eNodeB to a gateway node, where it is parsed. The X2 message may be interworked to the X2 format of another vendor, e.g., using the specific load information threshold of the another vendor, and sent to an another vendor-branded eNodeB.

As another example, a core network may send out an X2 protocol update that adds a new X2 message. The X2 message may be sent to a eNodeB as an executable payload in a special information element, to compatible eNodeBs. For incompatible eNodeBs, a gateway may block the message completely. This enables dynamic code execution, dynamic modification of code, and dynamic upgradability/deployability of code. This also enables dynamic extensibility of a protocol.

In some embodiments, a module for providing message manipulation may use preconfigured information to know what protocol versions, information elements (IEs), etc. are supported by each particular base station or gateway. The module may include mappings from one IE to another IE. The module may include a database to store such mappings. The module may include, in the database, scripting snippets that perform the mapping. In some embodiments, multiple snippets may be assembled or executed to form a final message, much like a plurality of filters may be stacked to provide an output. In some embodiments, deployment of new code may be performed from a gateway that has a map or table that identifies which devices have received the new code and which have not. In some embodiments, versioning of the protocol on each device on the network may be stored. In some embodiments, stored version information and stored mappings may be shared among network nodes. For example, if more than one gateway server in a core network is in use, they may communicate with each other to share mappings and information about supported protocol versions in the RAN.

These systems and methods may be called protocol programmability. At least two types of programmability are contemplated: parameter programmability, wherein a parameter is passed using a message, and logic programmability, wherein logic is passed or logic is processed at the node.

This can be particularly helpful when performing inter-cell interference cancellation (ICIC), enhanced ICIC (eICIC), mobility robustness optimization (MRO), load balancing (intra- and inter-radio access technology, or RAT), and self-organizing networks (SON). These methods entail the use of unitless thresholds that are used to measure signal quality. However, a "1000" threshold of one vendor's equipment is not necessarily any different than a "100" threshold of another vendor's equipment. These differing thresholds can be interworked in a lightweight way using a database of rules and/or a scripting language-based, on-the-fly message processor.

Since the vision of the multi-vendor RAN and the multi-vendor HetNet in particular is to improve opex and capex and increase network performance through access to global-scale innovations in a truly competitive multivendor marketplace, this approach can help deliver interoperability at scale and low cost, without proprietary implementation of each interworking for each vendor.

Instead of implementing the proprietary implementation of different vendors in the code, it would be very beneficial if we have the X2 Message Manipulator feature (fully configurable) along with interworking framework. Using this feature, we would be able to work with any vendor without changing the code for each vendor's implementation. This would save us time on development and also not worrying in future about different implementations in the code stream.

The message processor or message manipulator may cause a state machine in the base station or the gateway to change state. For example, load may be reported from one eNodeB in the RAN in a message to the gateway. The gateway may enter a load mitigation state as a result, even if this message is not sent to other eNodeBs in the network.

The message processor may take one message that comes in and apply an arbitrary transformation to it before it emerges, including sending it to one or more different or the same destinations, rewriting the message, adding to or subtracting from the message, etc.

The message processor may account for differing information available regarding the state of the network when processing messages. For example, if a base station sends a message to the core network, the message processor may know that many base stations are connected, and may also know that the core network knows only that a single base station is connected, and the message processor may adjust, e.g., the message sender of a protocol message accordingly.

In some cases, a base station may not support a particular information element (IE). The gateway may provide compatibility of this base station for messages arriving from other base stations or other hosts, by either rewriting the particular IE into a more compatible IE, or by silencing the IE so that the base station does not fail. Avoiding crashes due to this type of interoperability failure is a significant application for this technology.

X2AP Support

The X2AP protocol enables the following functions, each of which may be processed and manipulated by a message processor as described herein, each of which may also be augmented or normalized using such a message processor.

Mobility Management—This function allows the eNB to move the responsibility of a certain UE to another eNB or request another eNB to provide radio resources for a certain UE while keeping responsibility for that UE. Forwarding of user plane data, Status Transfer and UE Context Release function are parts of the mobility management.

Load Management—This function is used by eNBs to indicate resource status, overload and traffic load to each other. However, these load measurements are often not equivalent among vendors.

Reporting of General Error Situations—This function allows reporting of general error situations, for which function specific error messages have not been defined. In some embodiments, the use of a message processor could allow any number of error messages to be supported by the network, not just general errors.

Resetting the X2—This function is used to reset the X2 interface.

Setting up the X2—This function is used to exchange necessary data for the eNB for setup the X2 interface and implicitly perform an X2 Reset.

eNB Configuration Update—This function allows updating of application level data needed for two eNBs to interoperate correctly over the X2 interface. In some embodiments, when a gateway receives this message, it may update its internal state machine and mappings with the version of the eNodeB X2 protocol, etc., before passing this message on unmodified to a target X2 node.

Mobility Parameters Management—This function allows the eNB to coordinate adaptation of mobility parameter settings with a peer eNB. However, these parameters are often not equivalent among vendors.

Mobility Robustness Optimisation—This function allows reporting of information related to mobility failure events. However, this information is often not equivalent among vendors.

Energy Saving—This function allows decreasing energy consumption by enabling indication of cell activation/deactivation over the X2 interface.

X2 Release—This function allows an eNB to be aware that the signaling connection to a peer eNB is unavailable.

Message transfer—This function allows indirect transport of X2AP messages to a peer eNB.

Registration—This function allows registration of eNB in case indirect transport of X2AP messages is supported.

Removing the X2—This function allows removing the signaling connection between two eNBs in a controlled manner.

The mapping between the above functions and X2 EPs is shown in the table below.

| Function | Elementary Procedure(s) |
|---|---|
| Mobility Management | a) Handover Preparation<br>b) SN Status Transfer<br>c) UE Context Release<br>d) Handover Cancel |
| Dual Connectivity | a) SeNB Addition Preparation<br>b) SeNB Reconfiguration Completion<br>c) MeNB initiated SeNB Modification Preparation<br>d) SeNB initiated SeNB Modification<br>e) MeNB initiated SeNB Release<br>f) SeNB initiated SeNB Release<br>g) SeNB Counter Check |
| Load Management | a) Load Indication<br>b) Resource Status Reporting Initiation<br>c) Resource Status Reporting |
| Reporting of General Error Situations | Error Indication |
| Resetting the X2 | Reset |
| Setting up the X2 | X2 Setup |
| eNB Configuration Update | a) eNB Configuration Update<br>b) Cell Activation |
| Mobility Parameters Management | Mobility Settings Change |
| Mobility Robustness Optimisation | a) Radio Link Failure Indication<br>b) Handover Report |
| Energy Saving | a) eNB Configuration Update<br>b) Cell Activation |
| X2 Release | X2 Release |
| Message transfer | X2AP Message Transfer |
| Registration | |
| Removing the X2 | X2 Removal |

Even though the above X2 procedures are defined in the specifications, the use of the methods described herein allows a particular vendor to create proprietary extensions that will fail gracefully even when not supported by another vendor's base station, for example, by using the message processor to suppress proprietary IEs.

The following X2 procedures (for SON) are not well defined in the specifications and each vendor is implementing this in proprietary way [2]. ICIC (Inter Cell Interference Co-ordination); eICIC (Enhanced Inter Cell Interference Co-ordination); MRO (Mobility Robustness Optimization); MLB (Mobility Load Balancing).

The X2 application part (X2-AP) [1] defines a range of structured procedures, of which the following are of relevance to this document:

Load indication: Used to pass load and interference coordination information between intra-frequency neighbors. Load information is used in ICIC and eICIC.

Resource status reporting/initiation: Reports resource loading from one cell to another; Resource reports are used in MLB; Also used in eICIC to give feedback on ABS status Mobility settings change: Requests update to handover settings; Used in MRO Radio link failure indication: Reports radio link failure causes; Used in MRO Handover report: Reports handover failures causes; Used in MRO Please see [2] for more details about the X2 interoperability challenges.

The X2 interoperability with multiple vendors could be expedited by having an X2 message manipulator feature providing programmability.

In some embodiments, some of the following features may be present. The X2 programmability gateway may provide the capabilities to manipulate the X2 messages on the fly. The X2 programmability gateway may provide the configuration to modify the X2 messages on ingress (messages coming from eNodeB) and egress (messages sent to the eNodeB) interfaces. The X2 programmability gateway may allow to add, modify and delete multiple IE's in the X2 messages. The X2 programmability gateway may allow to modify the values of the IE's with in the X2 messages. The X2 programmability gateway may allow the system or an operator to add/modify/delete an IE based on conditions like presence of a specific IE, presence of specific value in an IE etc.

The X2 programmability gateway may use Lua, Python, Ruby, Perl, Javascript, or any other scripting language to provide this functionality, see [6]. This would allow us to add the scripts to provide the X2 message manipulations. X2 Message manipulation feature may continue to work even after failover to a backup gateway. The X2 programmability gateway may provide a way to validate the x2 message manipulations performed by the configuration/script to make sure that it is not making the message invalid (due to encoding errors). In scenarios where the multi-vendor deployment is taking place, the X2 programmability gateway may enable an operator to configure the different rules/manipulations for different vendors. The X2 programmability gateway may provide the statistics for the manipulations performed on the X2 message per message type.

Use Cases

Inter-Cell Interference Coordination (ICIC). ICIC as implemented over X2 consists of three indications carried in the X2:LoadIndication message, as described below.

RNTP—Relative narrowband transmit power. A proactive signal sent on X2 from the transmitter to all of its X2 partners, with a '0' for a particular sub-carrier indicates that the sender will not transmit in that sub-carrier above a certain power relative to maximum; a '1' for the particular sub-carrier makes 'no promise', so it might, or it might not transmit above the threshold. It's valid until updated by another signal of the same type.

OI—UL interference overload indicator. A reactive signal sent on X2 from a receiver to all of its X2 partners that can take a low, medium, high value. These thresholds/values are undefined and vary per vendor. Indicates that the sender has observed such an interference level on the given PRB. Valid for the period immediately preceding its reception, but not clear exactly what the measurement period is. Sent with a minimum periodicity of 20 ms, maximum μ.

HII—High interference indicator. A proactive signal sent on X2 from the receiver to all of its X2 partners that carries a target cell id and then a bit string to indicate that the source cell is about to schedule uplink power to a cell-edge user. Valid for the 'near future.' Sent with a minimum periodicity 20 ms, maximum ∞.

There is no value in any of these messages for cell center users. They only have meaning for users in the cell edge area. Consequently, the key point about ICIC as currently defined over X2 is that it assumes a traditional single-layer, cell-edge to cell-edge deployment, without small cell underlay or overlay.

However, compared with the classical single-layer/single-vendor approach used in the macro network, HetNet deployments will frequently be characterized by ill-defined cell edge boundaries. Whereas the majority of small cells may be deployed towards the edge of the macro cell, some deployments may include small cells that are located away from the traditional macro cellular edge.

In single-layer (non HetNet) applications, where cell-edge to cell-edge is the dominant interaction, ICIC as defined may be highly interoperable. In such cases, as well as other corner cases where small cells are only deployed at the edge of traditional macro cells, the RNTP thresholds need to be defined to match on each side of the IOT boundary.

During the X2 IOT with the vendors, as some of the IE's values/thresholds are not well defined, we might have to manipulate these on the fly to interwork with these vendors.

Examples: Manipulation of the RNTP IE in the Load Indication Procedure—Load Information message; Change the threshold value; Change the PDCCH Interference Impact value; Interaction between UL Interference Overload Indication and UL High Interference Indication IE's in the Load Indication Procedure—Load Information message; Changing the value of UL High interference indication depending on UL interference overload indication.

Mobility Load Balancing. The capacity and performance of the RAN is maximized when the load is balanced as evenly as possible across the available resources. The underlying problem to be solved is that given incoming stochastic demand, either in terms of calls or data, the likelihood of the network running out of any resource required to service that demand wherever it arises must be minimized. MLB, as the name implies, seeks to achieve this by adjusting the mobility settings between cells so that the normal handover mechanisms move load between cells towards a state of balance. A secondary objective of the feature is to minimize the number of load balancing related handovers. The feature is divided into two parts. Firstly, the balance is achieved by adjusting intra-LTE mobility settings so that load is balanced solely within the LTE layer(s). Secondly, the balance may be achieved by adjusting inter-RAT settings to balance load between LTE and another layer (probably 3G). The inter-RAT MLB feature is very lightly specified, and essentially uses the RAN information management (RIM) feature to implement a proprietary mechanism for load balancing between technologies. As such, inter-RAT MLB is non-interoperable as specified today.

IOT gaps for PRB (physical resource block) status reports. Different eNB implementation may differ regarding how they calculate the total available PRBs. This may result in the following: Lead to different PRB usage value and cause confusion in multi-vendor HetNet; and Impact load balancing performance. Note that the specification itself admits to leaving it to the vendor to decide how to treat PRBs that are not available for regular traffic.

IOT gaps for TNL (Transport network load) and HW loads status reports. There is no definition of how HW load or TNL load should be calculated or categorized into the load enumeration (low, medium, high, overload), or of the significance of these calculations for network performance and the significance of the reported enumeration in terms of expected action or response.

Also, depending on the absolute values of these items on either side of an IOT barrier, undesirable effects may be encountered. For example, eNB1—with very high absolute capacity may be under high Load, e.g., a macro cell eNB2—with low absolute capacity may be under low Load, e.g., a small cell It seems reasonable, given the semantics of the message, to attempt to move load from the High Load device to the Low Load device. However, since the absolute capacities differ, the load required to be shed from eNB1 to move it from High Load to Medium Load may completely swamp eNB2, driving it immediately into overload. To have effective load balancing in this case may requires more information than is available in the messaging.

IOT gaps for composite available capacity status reports. The main issue with this message is the lack of definition of the IEs and how to calculate them, which the recommendations seek to resolve. In particular, the abstract quantity cell capacity class IE above is inadequate to the purpose of load balancing between layers of the HetNet where the actual absolute value of cell capacity may be widely different between the small cell and the macro layers.

IOT gaps for mobility settings change message. There are multiple handover parameters to control the handover trigger and different vendors may understand and implement them differently. If two cells adjust different parameters uncoordinatedly, the mobility setting change procedure may cause handover performance degradation, or impact load balance effectiveness.

Examples: Manipulation of the Radio resource status IE in the Resource Status update message. Manipulation of S1 TNL Load Indicator IE in the Resource Status update message. Manipulation of HW Load Indicator IE in the Resource Status update message. Manipulation of handover parameters for mobility, mobility settings change procedure (Mobility Parameters Modification Range IE, and Mobility parameters information IE).

Radio Link Failure Indication Procedure. The purpose of the Radio Link Failure Indication procedure is to transfer information regarding RRC re-establishment attempts, or received RLF Reports, between eNBs. The signalling takes place from the eNB at which a re-establishment attempt is made, or an RLF Report is received, to an eNB to which the UE concerned may have previously been attached prior to the connection failure. Examples: Deletion of any optional IE in the RLF indication message. Modification of the value for any IE in the RLF indication message.

Network Architecture

FIG. 1 is a schematic diagram of a Long Term Evolution (LTE) architecture, in accordance with some embodiments. Cell 101 is served by macro eNodeB 108. Cell 102 is served by macro eNodeB 109. Cell 103 is served by small cell eNodeB 105, which is a multi-radio access technology (RAT) mesh eNodeB. Cell 104 is served by small cell eNodeB 106, which is a multi-radio access technology (RAT) mesh eNodeB. Small cell eNodeBs 105, 106 are served for backhaul by wireless backhaul gateway eNodeB 107. Small cell eNodeBs 105, 106 and gateway eNodeB 107 are coupled to LTE access controller 110, which is a virtualization server and gateway; these nodes are considered to be within the gateway. Macro eNodeBs 108, 109 are also coupled to LTE access controller (LAC) 110, outside of the gateway. Macro eNodeBs 108, 109 and LAC 110 are coupled to mobility management entity (MME) 112. MME 112 and LAC 110 reside in core network 111. Dotted lines indicate X2 connections and solid lines are S1 connections. In some portions of this disclosure, an eNodeB within the gateway may be referred to as a mesh eNodeB, small cell, or a converged wireless system (CWS). LTE access controller 110 is a programmable message processor that processes X2 messages, in accordance with some embodiments.

In the network depicted in FIG. 1, small cell 103 is a neighbor to macro cell 101. This relationship may be identified in an X2 setup request or response message, either from mesh eNodeB 105 or macro eNodeB 108 to LAC 110. Whether the X2 message is received from mesh eNodeB 105 or macro eNodeB 108, if one eNodeB identifies the other as a neighbor, it implies that the relationship is associative, i.e., that the other eNodeB has the same neighbor relationship.

All the neighboring eNodeBs establish X2 connectivity between each other. When there are many small cells covering a given area, they will need X2 connectivity between them as shown above. In addition, a nearby macro eNodeB will establish X2 connectivity with many of the nearby small cells. S1 connections are point-to-point, i.e. one eNodeB has to establish only one S1 connection with the EPC (MME 112, as shown in FIG. 1). However, X2 connectivity is multi-point, such that each eNodeB 105, 106, 108, 109 may form an X2 connection with each other eNodeB. Moreover, X2 connections require an IP path between two eNodeBs. In one common deployment scenario in the prior art, each eNodeB has its point-to-point backhaul going up to a central data center that hosts the security gateway/EPC. That means the X2 IP path is also via the central data center. Due to increase in rate of handovers in small-cell deployment, the X2 IP path will put significant bandwidth requirement on the existing backhaul. This will not occur in the configuration depicted in FIG. 1 because no X2 connection is established between nodes 103, 108 and 104, 109.

Figure 2:
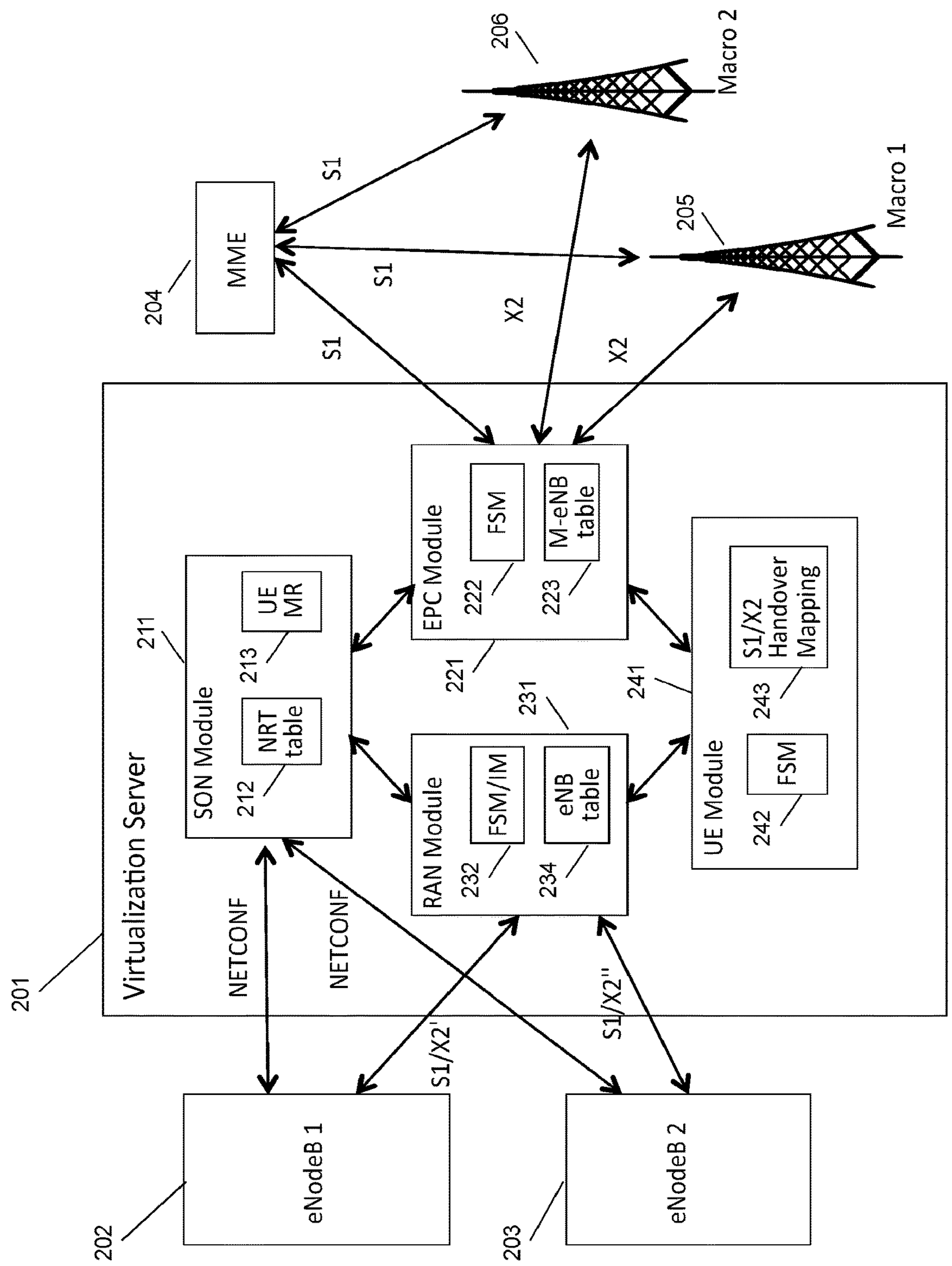
FIG. 2 is a schematic diagram of a programmable virtualization server in a Long Term Evolution (LTE) architecture, in accordance with some embodiments.

FIG. 2 is a schematic diagram of a programmable virtualization server in a Long Term Evolution (LTE) architecture, in accordance with some embodiments. Virtualization server 201 provides services to, and is coupled to, eNodeB 1 202 and eNodeB 2 203, on a RAN side of a network (i.e., inside of the gateway). Virtualization server 201 provides services to, and is coupled to, MME 204, macro eNodeB 205, and macro eNodeB 206, on a core network side of the network (outside of the gateway). Virtualization server 201 corresponds to LAC 110, in some embodiments. The programmable virtualization server performs programmable processing of X2 messages, in accordance with some embodiments.

eNodeB 202 uses a first version of the X2 protocol, labeled X2', and eNodeB 203 uses a second version of the X2 protocol, labeled X2". These protocols may be similar to a degree but differ in some degree. Virtualization server 201 is configured, as shown, to interwork X2' and X2" messages so that both eNodeBs 202 and 203 are able to use their own distinct dialect of X2, as described herein.

Within virtualization server 201 are self-organizing network (SON) module 211, containing neighbor relation table (NRT) 212 and UE measurement report processing module 213; evolved packet core (EPC) module 221, containing EPC finite state machine module 222 and macro eNodeB table 223; radio access network (RAN) module 231, containing eNodeB finite state machine module/interpretation module 232 and eNodeB table 234; and user equipment (UE) module 241, containing UE finite state machine module 242 and S1/X2 handover mapping table 243. Each of modules 211, 221, 231, and 241 are coupled to each other within virtualization server 201, and may execute on one or more shared processors (not shown) coupled with memory (not shown). The interpretation module and finite state machine module 232 perform X2 and other message processing, utilizing X2 protocol version information specific to each eNodeB 202, 203 coupled to server 201 to provide a mapping of one protocol to another (e.g., X2' to X2"), or programmatic transformation of one protocol to another, or scripting hooks to enable transformation of one protocol to another, in accordance with some embodiments.

In some embodiments, SON module 211 may perform NRT maintenance, load information processing and fractional frequency reuse (FFR) processing; RAN module 231 may perform X2 association management with eNodeBs 202, 203; EPC module 221 may perform X2 association management with macro eNodeBs 205, 206; and UE module may perform X2 handover and S1/X2 translation between eNodeBs 202, 203 and macro eNodeBs 205, 206. All the above managers/modules interact with each other to accomplish the assigned functionality.

In some embodiments, EPC module 221 may contain EPC finite state machine module 222 and macro eNodeB table 223. EPC finite state machine module 222 may track the state of any messages or call flows being sent or received with a macro eNodeB, such as macro eNodeBs 205, 206. EPC FSM module 222 may, for example, determine whether a handover has been initiated by macro eNodeB 205, 206, as well as other functions. EPC FSM module 222 may also track which eNodeBs within the network are involved in communicating with the macro eNodeBs, and may perform network address translation by mapping incoming requests and messages from an eNodeB address external to the gateway 201 to an address internal to the gateway 201, using eNodeB table 223. In some embodiments the tracking and network address translation functions may be performed at the RAN module or in another module. Macro eNodeB table 223 may track all macro eNodeBs and any connections, bearers, tunnels, or calls open between an eNodeB internal to the gateway, such as eNodeBs 202 and 203.

In some embodiments, RAN module 231 may contain RAN finite state machine module 232 and eNodeB table 234. RAN module 231 is the counterpart to EPC module 221 on the side of the network inside the gateway. RAN FSM module 232 may track and receive messages and requests, and may track the state of the RAN node in any message exchange. eNodeB table 234 may include a mapping to from an eNodeB ID or cell ID to the ECGI ID used outside of the private network. In some embodiments, RAN module 231 may use eNodeB table 234 to perform network address translation, if applicable, on messages received by RAN module from eNodeBs 202, 203, so that the messages can be sent upstream to the EPC and/or core network. In some embodiments, network address translation is used at both RAN module 231 and EPC module 221, for connections initiated at the RAN and at the EPC, respectively.

In some embodiments, RAN module 231 may determine that an X2 connection may be terminated locally, without being sent outside the gateway, or even without being sent to the gateway at all. In those cases, RAN module 231 can instruct eNodeBs 202, 203 to perform direct X2 communication.

As RAN module 231 is in the data path for all S1 communications to the core network, including communications to MME 204, RAN module 231 may perform proxying and network address translation for the S1 connection, in addition to supporting the X2 connection, in some embodiments. RAN module 231 may also pass along any UE measurement reports received from UEs to either or both of UE module 241 and SON module 211.

In some embodiments, UE module 241 may contain UE finite state machine module 242 and S1/X2 handover mapping table 243. UE finite state machine module 242 may track states for call flows that are in process between a UE connected to one or more eNodeBs and either a core network node or a target eNodeB. For example, UE FSFM 242 may track when an X2 handover request message has not been responded to and should expire. UE FSFM 242 may also track X2/S1 handovers, in conjunction with S1/X2 handover mapping table 243. When an X2 handover request is received, UE FSFM 242 may, in some embodiments, determine whether a handover should be translated from S1 to X2, or vice versa, before the handover should continue. UE module 241 handles UE-related requests from both the RAN module 231 (from nodes internal to gateway 201) and from EPC module 221 (from nodes external to gateway 201).

Gateway

Figure 3:
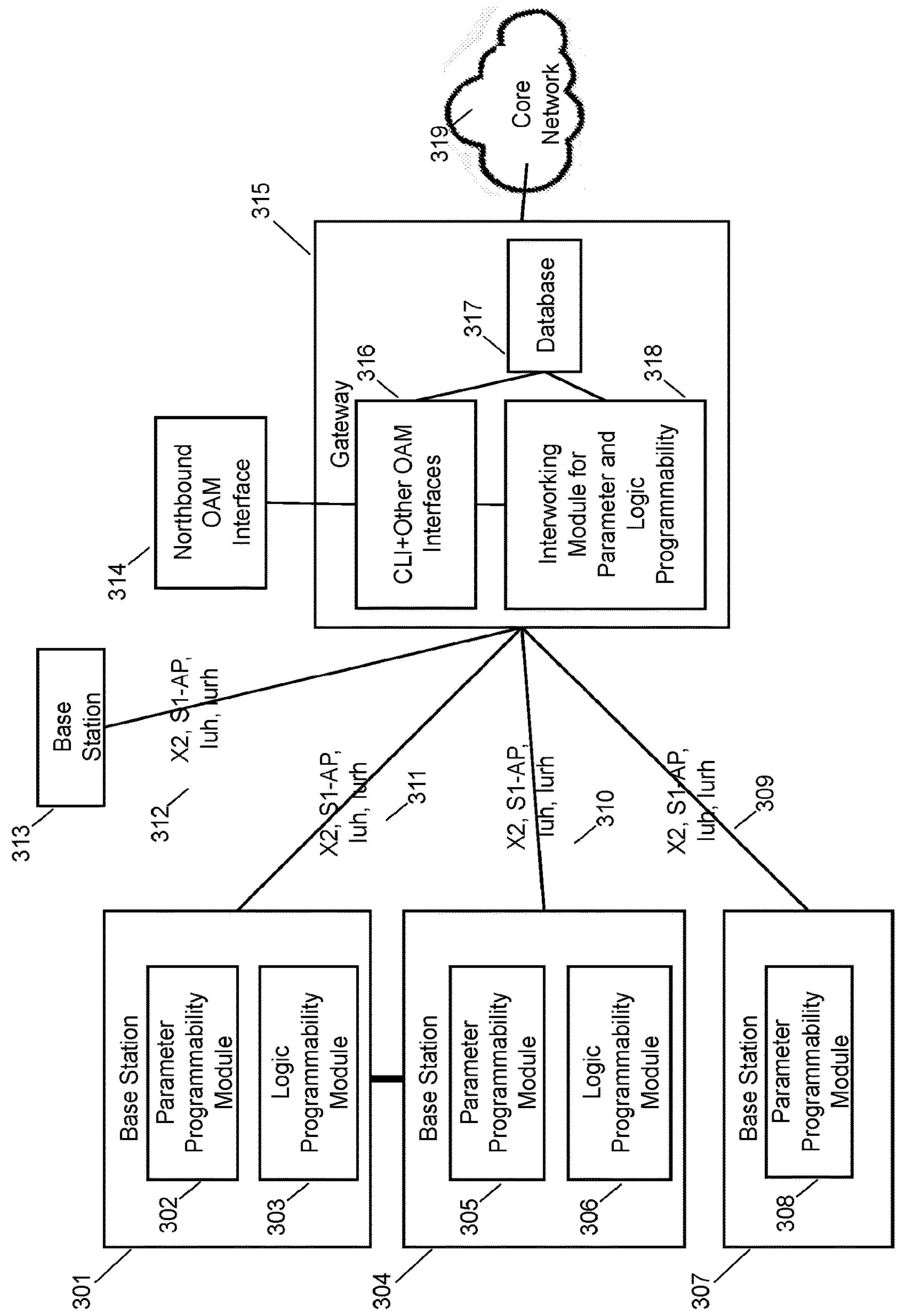
FIG. 3 is a schematic diagram of a programmable virtualization server coupled to enhanced base stations in a Long Term Evolution (LTE) architecture, in accordance with some embodiments.

FIG. 3 is a schematic diagram of a programmable virtualization server coupled to enhanced base stations in a Long Term Evolution (LTE) architecture, in accordance with some embodiments. Base stations 301, 304 are connected via X2, and each contain parameter programmability modules 302, 305 and logic programmability modules 303, 306. Parameter programmability modules permit the alteration of parameters at the base station. Logic programmability modules permit the alteration of logic at the base station. Both may be present, or one, as shown at base station 307 with only parameter programmability module 308, or none, as shown at base station 313. Each base station communicates 309, 310, 311, 312 via one or more of X2, S1-AP, Iuh, Iurh interfaces with a gateway 315. The gateway 315 is as described in FIG. 2, and includes northbound management interface 314, command line and other management interfaces 316, database 317, and interworking module for parameter and logic programmability 318, as described elsewhere herein, as well as other components and modules as shown in FIG. 2. Gateway 315 sits between the RAN and the core network 319. Core network 319 includes different nodes depending on the type of core network; for an LTE core network it would include a serving gateway (SGW, not shown) and a packet gateway (PGW, not shown).

In operation, the base stations 301, 304 may communicate directly via X2, and may use their parameter and logic programmability functions amongst themselves (they may permit mappings as described elsewhere herein just as permitted on gateway 314). However, in some cases they may attempt to communicate with base station 313, or even base station 307. Gateway 315 may transform at module 318 their X2 messages to permit seamless interoperation even when not all base stations support the same commands. As gateway 315 is also still a proxy, in some cases it may terminate or otherwise participate in the X2 connection to inform base stations 301 or 304 that certain functionality is not available.

Figure 4:
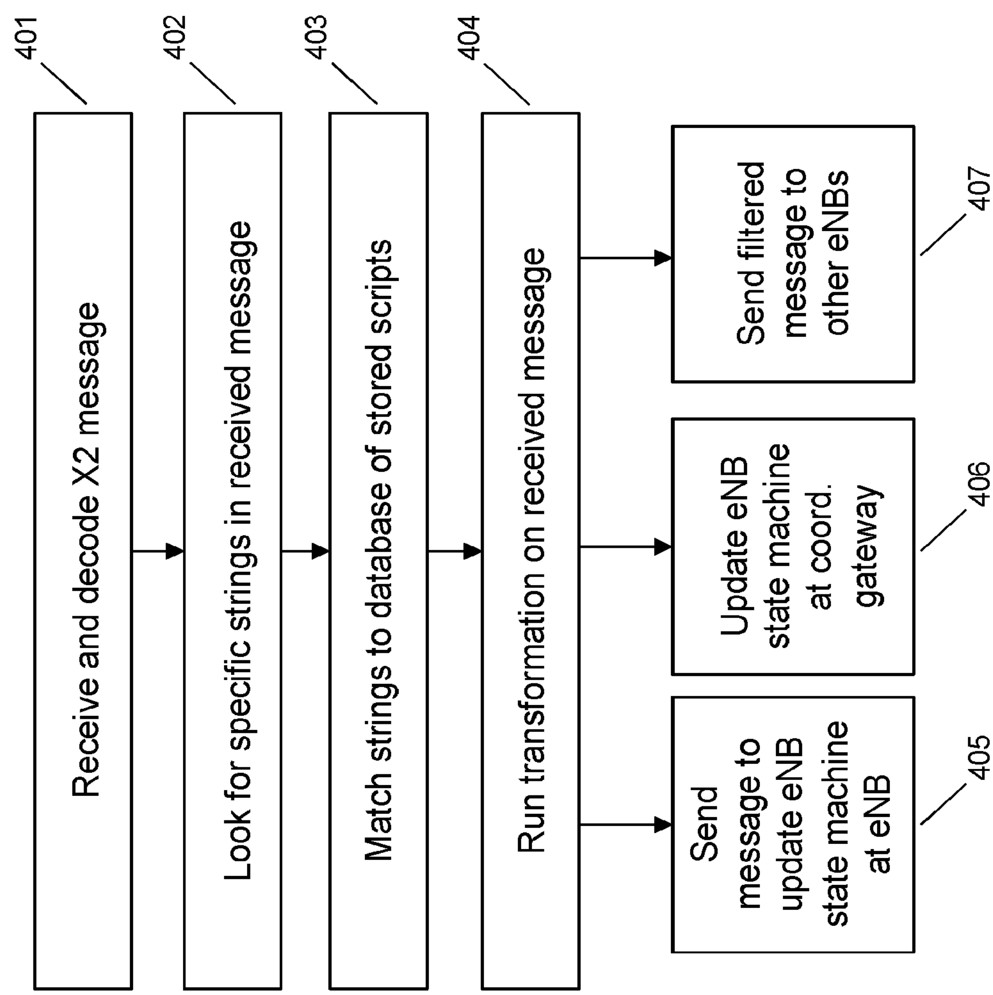
FIG. 4 is a flowchart of a representative programmable interworking message flow, in accordance with some embodiments.

FIG. 4 is a flowchart of a representative programmable interworking message flow, in accordance with some embodiments. At step 401, a message processor receives and decodes an X2 message from a base station. At step 402, the message processor looks for specific strings in the received message, for example, by performing a binary match, by examining the first few bytes of the message, or preferably by performing a regular expression match against one or more of a set of rules in a rules database. If one or more matches are identified, at step 403, the stored rules or scripts are retrieved. The rules database may include simple transformations stored as regular expressions. The rules database may include scripts, which may take various forms as described herein. At step 404, the transformations or rules or scripts are executed, optionally taking the received message as input parameters. Depending on the output of step 404, one or more of the following steps 405, 406, 407 are executed.

At step 405, a message is sent to update a base station, such as the source base station. The update message may be an X2 message and may be a command to update a state machine, to update a configuration, to run a script or program, or other message. The targeted base station (here described as an eNodeB) performs the requested reconfiguration. At step 406, the message processor updates its own local state machine. The local state machine may be at the coordinating gateway. In some cases this may be because a state is updated both at the eNodeB and at the coordinating gateway, or in some cases this may require an update only at the gateway. At step 407, a message is generated, either the original message, a transformed original message, or an entirely new message based on the original X2 message, and it is sent to one or more other base stations in the network, such as the direct neighbors of the sending eNodeB. An example would be an X2 message received from the originating eNodeB to coordinate ICIC. The message may be transformed to correct or change the ICIC signaling and sent out to known neighbors of the originating eNodeB to coordinate noise.

Base Station

Figure 5:
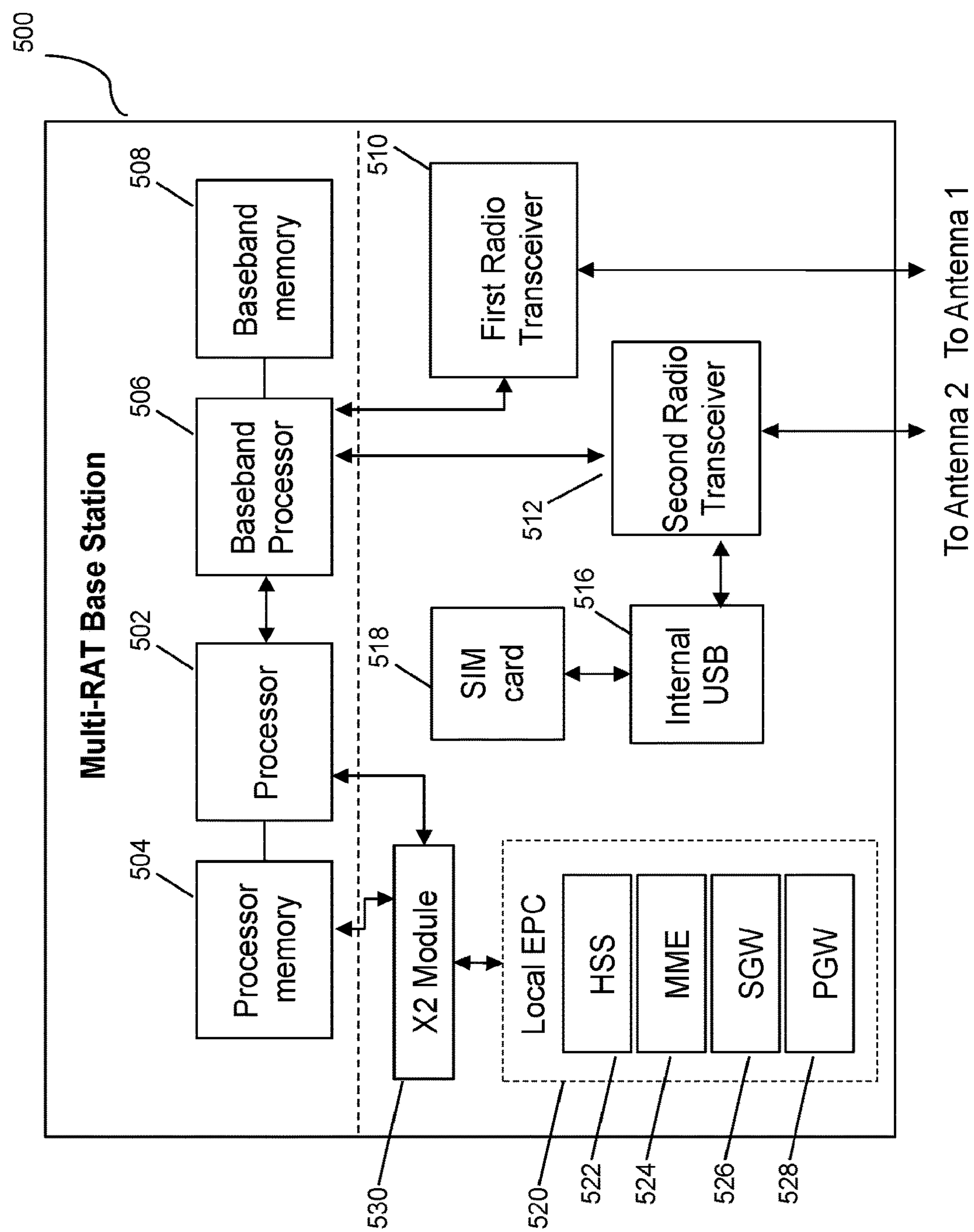
FIG. 5 is a schematic diagram of a mesh network base station, in accordance with some embodiments.

FIG. 5 is a schematic diagram of a multi-radio access technology (RAT) base station, in accordance with some embodiments. Multi-RAT base station 500 may include processor 502, processor memory 504 in communication with the processor, baseband processor 506, and baseband processor memory 508 in communication with the baseband processor. Base station 500 may also include first radio transceiver 510 and second radio transceiver 512, internal universal serial bus (USB) port 516, and subscriber information module card (SIM card) 518 coupled to USB port 514. In some embodiments, the second radio transceiver 512 itself may be coupled to USB port 516, and communications from the baseband processor may be passed through USB port 516.

An X2 module 530 may also be included for communicating with other base stations, in a point-to-point fashion or through an X2 proxy server. The X2 module may include one or more of the parameter programmability module and logic programmability module described with relation to FIG. 3. The X2 module may enable remote alteration of state machines, local state, logic, algorithms, configuration files, or stored code at the base station. In some embodiments, scripting and remote processing may be enabled at the X2 module, and X2 messages received from a remote server may trigger such scripts and remote processing. A mapping and a database may also be provided at this X2 module in some embodiments, similar to the modules present at the gateway 315 shown in FIG. 3.

Local EPC 520 may be used for authenticating users and performing other EPC-dependent functions when no backhaul link is available. Local EPC 520 may include local HSS 522, local MME 524, local SGW 526, and local PGW 528, as well as other modules. Local EPC 520 may incorporate these modules as software modules, processes, or containers. Local EPC 520 may alternatively incorporate these modules as a small number of monolithic software processes. Virtualization layer 530 and local EPC 520 may each run on processor 502 or on another processor, or may be located within another device.

Processor 502 and baseband processor 506 are in communication with one another. Processor 502 may perform routing functions, and may determine if/when a switch in network configuration is needed. Baseband processor 506 may generate and receive radio signals for both radio transceivers 510 and 512, based on instructions from processor 502. In some embodiments, processors 502 and 506 may be on the same physical logic board. In other embodiments, they may be on separate logic boards.

The first radio transceiver 510 may be a radio transceiver capable of providing LTE eNodeB functionality, and may be capable of higher power and multi-channel OFDMA. The second radio transceiver 512 may be a radio transceiver capable of providing LTE UE functionality. Both transceivers 510 and 512 are capable of receiving and transmitting on one or more LTE bands. In some embodiments, either or both of transceivers 510 and 512 may be capable of providing both LTE eNodeB and LTE UE functionality. Transceiver 510 may be coupled to processor 502 via a Peripheral Component Interconnect-Express (PCI-E) bus, and/or via a daughtercard. As transceiver 512 is for providing LTE UE functionality, in effect emulating a user equipment, it may be connected via the same or different PCI-E bus, or by a USB bus, and may also be coupled to SIM card 518.

SIM card 518 may provide information required for authenticating the simulated UE to the evolved packet core (EPC). When no access to an operator EPC is available, local EPC 520 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 500 is not an ordinary UE but instead is a special UE for providing backhaul to device 500.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 510 and 512, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 502 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 502 may identify the appropriate network configuration, and may perform routing of packets from one network interface to another accordingly. Processor 502 may use memory 504, in particular to store a routing table to be used for routing packets. Baseband processor 506 may perform operations to generate the radio frequency signals for transmission or retransmission by both transceivers 510 and 512. Baseband processor 506 may also perform operations to decode signals received by transceivers 510 and 512. Baseband processor 506 may use memory 508 to perform these tasks.

Additional Embodiments

In some embodiments, a rule provisioning system is provided. A central database may provide provisioning of new rules. A command line or script may be used to initiate provisioning of the rules.

A base station may authenticate authorized rules by using public key encryption methods, or by authenticating against a trusted hash.

This approach could be used for X2, S1-AP, Iuh, Iurh, or other protocols to get the similar benefits in multiple radio technologies such as 3G, 2G and WiFi.

In some embodiments, a multi-RAT base station is described that includes a protocol manipulation module. In some embodiments, a coordinating server, in some cases acting as a gateway for multiple base stations, is described that includes a protocol manipulation module.

In some embodiments, processing may be performed at a gateway using a text filter.

In some embodiments, the X2 gateway can act as eNB. (As a B2B proxy.);

In some embodiments, X2 resource management may be supplemented with additional IEs for resource management, e.g., scheduling, resource blocks, load.

In some embodiments, we use Python or Lua scripts to change X2 protocol, read file to change parameters.

This enable on-the-fly remote updates, and enables dynamically changing the protocol as it comes in and as it goes out;

For example, we may read out X2 message; apply text matching/regular expression to identify keys; select script from a database; run the script on the message; update the eNB state machine if needed; send out the filtered message to other nodes over X2.

Private IEs may be used to manipulate S1, Iuh, Iurh. This may work on top of Iuh, LPP, LPPA, S1, not just X2, and can be CLI or script driven.

In some embodiments, it is possible to mask or replace certain IEs or parts of IEs, i.e., Mask problems to keep particular eNB happy; Interwork between flavors of X2; Suppress crasher IEs; and don't need to change state machine.

In some embodiments, changing RAN modes is possible, add custom IEs. eNB to act on these. Also, the logic itself for the eNB state machine could be sent over the wire in a custom X2 message. e.g., dynamic code deployment a la SIP dynamic code execution; secure using keys in the RAN, etc. SIP is much higher layer, app layer, versus we are doing it at layer 4. Evaluate impact of a particular rule, you can change later. And allow state machine changes. And roll-backs.

In an example, we can create private IE, send to RAN, which changes the logic in the eNB state machine.

In another example, This allows manipulation of non-PW eNBs, third party eNBs; Receive X2 message, Load Indication Procedure, from Huawei eNB HNG changes it, sends updated message to core or other eNBs; report, e.g., "If you don't have support for this IE we will add it for you."

Example—RNTP; RNTP is a resource; Below or under certain threshold; What we could do; Vendor A is using threshold X (0.6); Vendor B is using threshold Y (0.7); We know which vendor uses what threshold; We need to know both; When someone asks, we can check. In 3 cases, we do not need to edit the limit at all; In the case that the actual measurement is between 0.6 and 0.7 we have to make a choice; There is an information deficit; We could ask for more information; We do not want to alter 0 to 1 or vice versa unless we know the actual received value is between 0.6 and 0.7; Stated differently, unless we have additional information to add here, we do not know whether or not we need to manipulate. Or we can override. Our information is better than yours. Force use of our value.

The base station may include: Dynamically extensible X2 protocol; Expose current X2 version to the operator via EMS; Rsrc management at eNB uses info from HNG; Sufficient info already given about what this is; State machine for each CWS at HNG, change state machine based on messages.

The coordinating gateway may include: Scripting language logic at HNG; Triggers, hooks in specific processing paths that can be triggered by certain X2, S1, etc. messages; These cause scripts to execute. State machine for each CWS at HNG, change state machine based on messages; Provide support to enable eNB to push-retrieve file from HNG; HNG knows the node supports the new version; New X2 rsrc management module; Part of RAN module; Integrated with, e.g., SON module, rsrc management module; Not exposed to packet core; Provides RNC type functionality; Roll into ICIC; X2 coordination with SON; Rsrc management at eNB uses info from HNG; God's eye view at HNG; Our SON is not just RF SON and RF planning; It includes network SON, e.g.; Route around congestion, slow links, backhaul issues, and other problems in network; Move users across RATs as needed; Includes processing based on type of call.

In some embodiments, generic representation (common form or internal form) may be performed; Normalize inputs to the internal form; Speak directly using internal representation.

Regular expression matching may include search, replace, modify, alternatives thereof.

X2GW brokering between eNodeBs and X2GW bridging across multiple protocols, e.g., 2G, 3G, 4G may be possible and permitted, as are a Generalized interworking gateway; proprietary network management; snmp; SS7 protocols. Text based; May transform to text based; Gateway should be in the path; So we can bridge between G's, we can bridge between X2 nodes sometimes; We can bridge between 2 X2 nodes if we configure them to use the GW as a proxy; We can bridge if a gateway; Preferably IP; ex. interference info from 1 G to another G.

In some embodiments, one may build an API for the gateways; Permit query; Permit client/server; Permit sync; Build an API for the controller; type-length-value (TLV); text-based field-value pairs; extensible markup language (XML); non-text-based encodings such as a packed encoding (e.g., ASN.1 PER) could be transformed into text-based encodings prior to performing the matching step described herein.

Alternatives

In the present disclosure, the words "eNodeB" or "eNodeB" are used to refer to a cellular base station. However, one of skill in the art would appreciate that it would be possible to provide the same functionality and services to other types of base stations, specifically to home eNodeBs (HeNodeBs), as well as any equivalents.

In the present disclosure, the words "federated," "virtualized," "proxy" or "proxied" may be viewed as aspects of the same concept. For example, it should be understood that the federated X2 gateway provides X2 virtualization, in that it federates X2 messages from a plurality of eNodeBs and virtualizes the plurality of eNodeBs to provide a single virtualized eNodeB. The X2 gateway provides this federation or virtualization at least in part by providing proxy functionality, such that X2 messages from each of the plurality of eNodeBs may be proxied by the X2 gateway to and from an EPC or core network node. Other meanings would be apparent to one having ordinary skill in the relevant technology area. The X2 gateway could be part of an LTE access controller or core network node, part of an eNodeB, co-located with another device, or on its own independent device.

While the present disclosure uses the term "small cell," this term is used merely to illustrate the concepts herein, and nothing is implied regarding size, power level etc. for any cells that could be used with the disclosed systems and methods, i.e. "small cell" may be interpreted as including macro cells, femto cells, multi-radio access technology (RAT) access nodes, indoor cells, outdoor cells, etc.

Various alternative embodiments are also contemplated by the inventors. For example, certain functions may be performed at an eNodeB, or at a multi-radio access technology node (multi-RAT) node, instead of at a virtualization server. The virtualization server may be known as an LTE access controller. The functions of the virtualization server may be broken up and spread across multiple network nodes, or multiple software or hardware modules within the same network node, and may be physically located in a single location, or multiple locations. The network node may be in the data path located between the radio access network (RAN) and the core network, in some embodiments, or may be located at another location in the network. A high-bandwidth wired connection may be used for backhaul, such as coaxial cable, fiber optic cable, or Ethernet, or a reduced-bandwidth wireless connection, such as microwave, line-of-sight, or other physical connections may be used as backhaul.

The protocols described herein may be optimized for greater or lesser latency, for more or fewer mesh nodes, for more or fewer data streams, and other alternatives. In some embodiments, these optimizations may be performed at the eNodeB, at the virtualization server, within a function performing radio resource allocation and coding selection, or at another location. In some embodiments, a virtualization server may identify and initiate power adjustments to improve channel quality.

In some embodiments, the mesh network nodes may provide complete or partial guesses at what paths are the optimal or best paths during a particular time interval, and may be enabled to send messages back to the virtualization server to communicate these complete or partial guesses.

In some embodiments, the base stations described herein may be compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A method for X2 interface communication, comprising:

at an X2 gateway for communicating with, and coupled to, a first and a second radio access network (RAN), receiving messages from the first RAN according to a first X2 protocol and mapping the received messages to a second X2 protocol for transmission to the second RAN;

maintaining operational state of at least one of the first RAN or the second RAN at the X2 gateway;

executing, at an interpreter at the X2 gateway, an executable payload received as part of the received messages;

updating the maintained operational state of the first RAN or the second RAN at the X2 gateway based on an effect of the executable payload; and interworking, at the X2 gateway, the first X2 message from the first X2 protocol to the second X2 protocol and associating the first X2 protocol with the first RAN and the second X2 protocol with the second RAN, based on a list of supported X2 protocol versions for the first RAN and the second RAN, wherein at least one of the supported X2 protocol versions is a list of supported individual information elements (IEs) and protocol commands, or an X2 protocol version number.

2. The method of claim 1, further comprising storing a plurality of rules in a database for performing mapping.

3. The method of claim 1, further comprising, at a regular expression pattern matcher at the X2 gateway, identifying patterns in the received messages that are present in the first X2 protocol but not present in the second X2 protocol.

4. The method of claim 1, further comprising sending a second X2 message to update an eNodeB state machine at the first RAN.

5. The method of claim 1, further comprising updating an eNodeB state machine at the X2 gateway based on the effect of the executed executable payload.

6. The method of claim 1, further comprising sending a filtered second X2 message to the second RAN.

7. The method of claim 1, further comprising providing code execution hooks for enabling the received messages according to the first X2 protocol to cause code execution at the X2 gateway.

8. The method of claim 1, further comprising providing code execution hooks for enabling code execution at the X2 gateway of the executable payload received via the received messages.

9. The method of claim 1, further comprising enabling new X2 protocol features via the executable code payload sent in an information element from the X2 gateway.

10. The method of claim 1, further comprising blocking transmission of executable code payloads from the X2 gateway to an incompatible RAN.

11. The method of claim 1, further comprising mapping a first unitless threshold value compatible with the first RAN to a second unitless threshold value compatible with the second RAN.

12. The method of claim 1, further comprising adding, deleting, or modifying information elements in the messages from the first RAN but not compatible with the second RAN to information elements compatible with the second RAN.

13. The method of claim 1, further comprising storing a plurality of rules in a database for performing mapping, the plurality of rules further comprising regular expression transformations of the received messages.

14. The method of claim 1, further comprising storing a plurality of rules in a database for performing mapping, the plurality of rules further comprising rules for interpretation by a scripting language message processor at the gateway server.

15. The method of claim 1, further comprising storing a plurality of rules in a database for performing mapping, the plurality of rules further comprising rules for interpretation by a scripting language message processor at the first RAN or the second RAN.

16. The method of claim 1, further comprising processing messages in Lua, Python, Ruby, Perl, or JavaScript.

17. The method of claim 1, further comprising handling X2 mobility management, load management, general error, X2 reset, X2 setup, X2 release, X2 removal, configuration update, mobility parameter management, mobility robustness optimization, or energy consumption management messages.

18. The method of claim 1, further comprising handling adjustment of inter-radio access technology (inter-RAT) or intra-radio access technology (intra-RAT) mobility thresholds.

19. The method of claim 1, further comprising:

receiving and decoding an initial X2 message from the first RAN;

identifying specific strings in the initial X2 message;

matching the identified specific strings in a database of stored scripts; and performing a transformation on the initial X2 message, the transformation being retrieved from the database for stored scripts, the stored scripts being transformations.

* * * * *